United States Patent [19]

Bouchan et al.

[11] Patent Number: 5,626,497

[45] Date of Patent: May 6, 1997

[54] MODULAR JACK TYPE CONNECTOR

[75] Inventors: Christophe Bouchan, Longjumeau; Franck Bordron, Paris; Pascal Grandclaude, Suresnes, all of France

[73] Assignee: Molex Incorporated, Lisle, Ill.

[21] Appl. No.: 489,600

[22] Filed: Jun. 12, 1995

[30] Foreign Application Priority Data

Jul. 14, 1994 [EP] European Pat. Off. ............. 94110980

[51] Int. Cl.⁶ .................................................. H01R 23/02
[52] U.S. Cl. ............................................ 439/676; 439/941
[58] Field of Search ..................................... 439/676, 941

[56] References Cited

U.S. PATENT DOCUMENTS

| | | | |
|---|---|---|---|
| 3,761,842 | 9/1973 | Gandrud | 439/941 |
| 5,186,647 | 2/1993 | Denkmann et al. | 439/395 |
| 5,269,708 | 12/1993 | DeYoung et al. | 439/676 |
| 5,295,869 | 3/1994 | Siemon et al. | 439/620 |
| 5,299,956 | 4/1994 | Brownell et al. | 439/638 |
| 5,310,363 | 5/1994 | Brownell et al. | 439/676 |
| 5,362,257 | 11/1994 | Neal et al. | 439/676 |

FOREIGN PATENT DOCUMENTS

| | | |
|---|---|---|
| 2268336 | 1/1994 | United Kingdom . |
| 2271678 | 4/1994 | United Kingdom . |

Primary Examiner—David L. Pirlot
Assistant Examiner—Tho D. Ta
Attorney, Agent, or Firm—A. A. Tirva

[57] ABSTRACT

A modular jack type connector includes a dielectric housing defining a plug-receiving cavity. A plurality of terminals are mounted on the housing. Each terminal includes a spring beam contact portion extending in cantilever fashion in a single row within the plug-receiving cavity, with the contact portions extending from curved base portions located in the housing, and tail portions projecting from the housing in two rows generally parallel to the single row such that each pair of adjacent terminals includes a tail portion in each row thereof. Intermediate portions extend between the curved base portions and the tail portions, with the intermediate portions of at least one of the pair of adjacent terminals being separated from each other in a direction generally parallel to the rows. Bowed portions join the intermediate portions and the tail portions of the one pair of adjacent terminals, with the bowed portions overlapping each in a plane transverse to the rows. Enlarged sections of the intermediate portions of at least another pair of terminals overlap each other in a plane generally parallel to the rows to define a physical capacitor between the another pair of terminals. The terminals are formed by first and second metallic lead frames of identical construction that are reverse-mounted and superimposed on the dielectric housing.

10 Claims, 7 Drawing Sheets

MODULAR JACK TYPE CONNECTOR

FIELD OF THE INVENTION

This invention generally relates to the art of electrical connectors and, particularly, to a modular jack type connector having a terminal system to reduce crosstalk.

BACKGROUND OF THE INVENTION

Generally, a modular jack type connector includes "spring beam contacts" which protrude from a portion of the jack housing into a plug-receiving cavity of the housing, the contacts or terminals usually being separated from each other by molded portions of the housing. The terminals include terminal portions, usually in the form of pins for mating with the terminals of a complementary electrical device. For instance, the terminal pins may form solder tails for insertion into holes in a printed circuit board and for solder connection to circuit traces on the board and/or in the holes. In some instances, the terminal pins or solder tails are arranged in a single row, but in many other instances the terminal pins or solder tails are arranged in two rows of an alternatingly staggered array. The spring beam contacts protrude into the plug-receiving cavity normally in a single row.

As is well known in this art, such modular jack type connectors are quite small or miniaturized and, consequently, the terminals are very closely spaced. Consequently, there exists a never-ending problem of noise or crosstalk between adjacent terminals, particularly in elongated straight/parallel portions of the terminals. Various approaches have been made to eliminate or reduce the crosstalk, such as providing ground planes on the jacks, and coupling filter components, such as capacitor filters, between the terminals and the ground plane. Adding such additional components as ground planes to such miniaturized connectors adds significantly to the costs of the connectors.

These problems further are complicated because of the standards in the telecommunications industry for high data rate transmission over twisted pair cables. In other words, the twisted cables which form the tip and ring wires of the transmission system must be coupled within the jack in a particular order.

The present invention is directed to solving these problems by providing a unique terminal configuration and/or array for reducing crosstalk between the terminals of the jack without adding components such as ground planes to the jack construction.

SUMMARY OF THE INVENTION

An object, therefore, of the invention is to provide a new and improved modular jack type connector of the character described above.

In the exemplary embodiment of the invention, the connector includes a dielectric housing means defining a plug-receiving cavity open at one end of the housing. A plurality of terminals are mounted on the housing with spring beam contact portions extending in cantilever fashion in a single row within the plug-receiving cavity. The contact portions extend from curved base portions fixed in the housing. The terminals include tail portions projecting from the housing in two rows generally parallel to the single row of contact portions, such that each pair of adjacent terminals includes a tail portion in each row thereof.

The invention contemplates that the terminals include intermediate portions extending between the curved base portions and the tail portions with the intermediate portions of at least one of the pair of adjacent terminals being separated from each other in a direction generally parallel to the rows. The terminals include bowed portions joining the intermediate portions and the tail portions of the at least one pair of adjacent terminals, with the bowed portions overlapping each other in a plane generally parallel to the rows. Enlarged sections of the intermediate portions of at least one other pair of terminals overlap each other in a plane generally parallel to the rows to define a physical capacitor between the other pair of terminals.

As disclosed in the preferred embodiment herein, the enlarged sections of the intermediate portions of the terminals comprise generally parallel overlapping planar sections. An adjacent pair of terminals at each opposite end of the row thereof includes the separated intermediate portions and the bowed portions. Two pairs of terminals, between the adjacent pairs at each opposite end of the row, include the enlarged sections to define two physical capacitors.

The invention also contemplates that first and second metallic lead frames be provided, with each lead frame including a plurality of the terminals. The lead frames are superimposed over each other on the dielectric housing means. The first and second lead frames are identically constructed but are reverse-mounted on the dielectric housing means in a left-to-right direction transversely of the lead frames. Still further, an insulating plate is superimposed between the two superimposed lead frames within the dielectric housing means.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
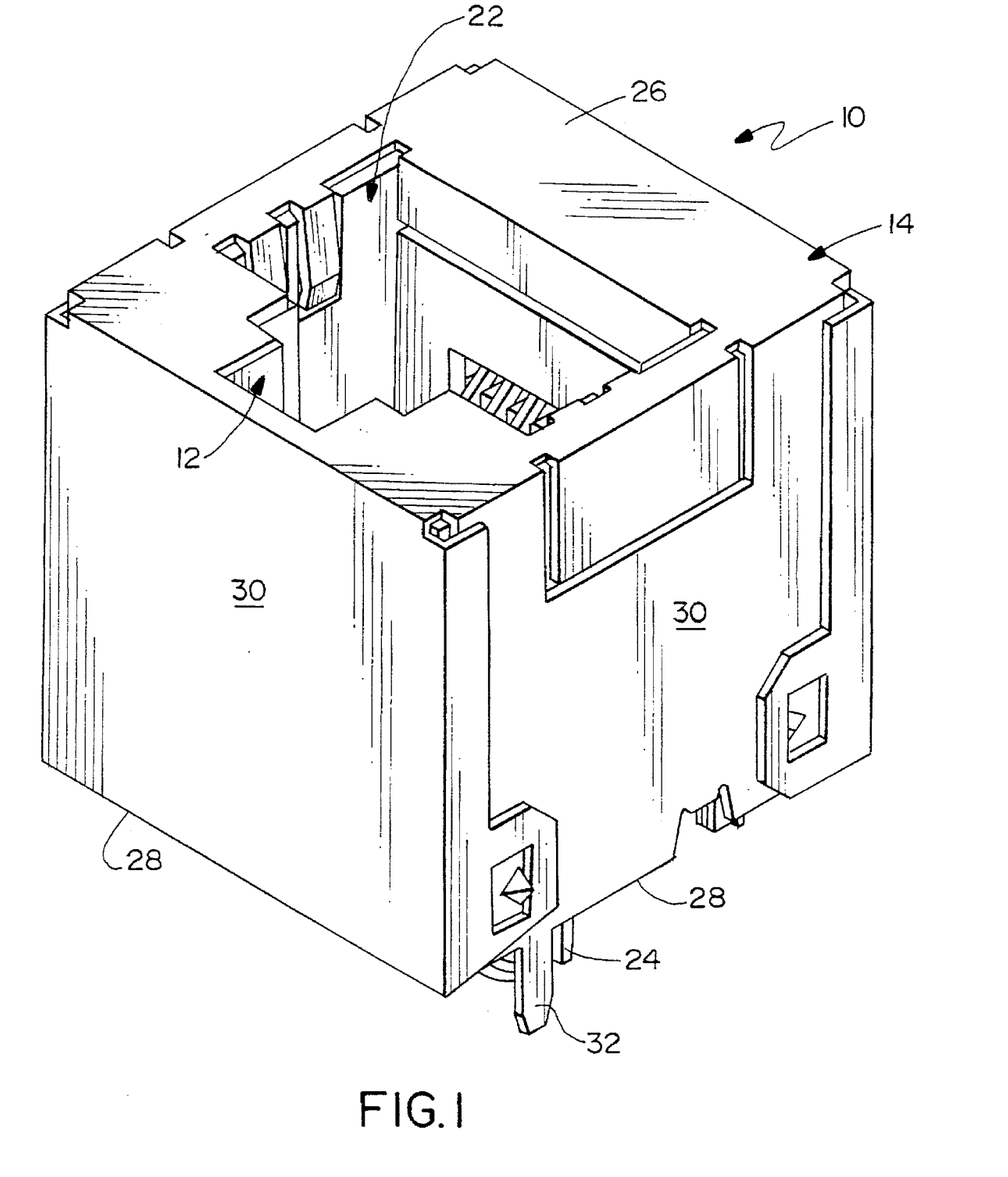
FIG. 1 is a perspective view of a modular jack type connector incorporating the concepts of the invention.
Figure 2:
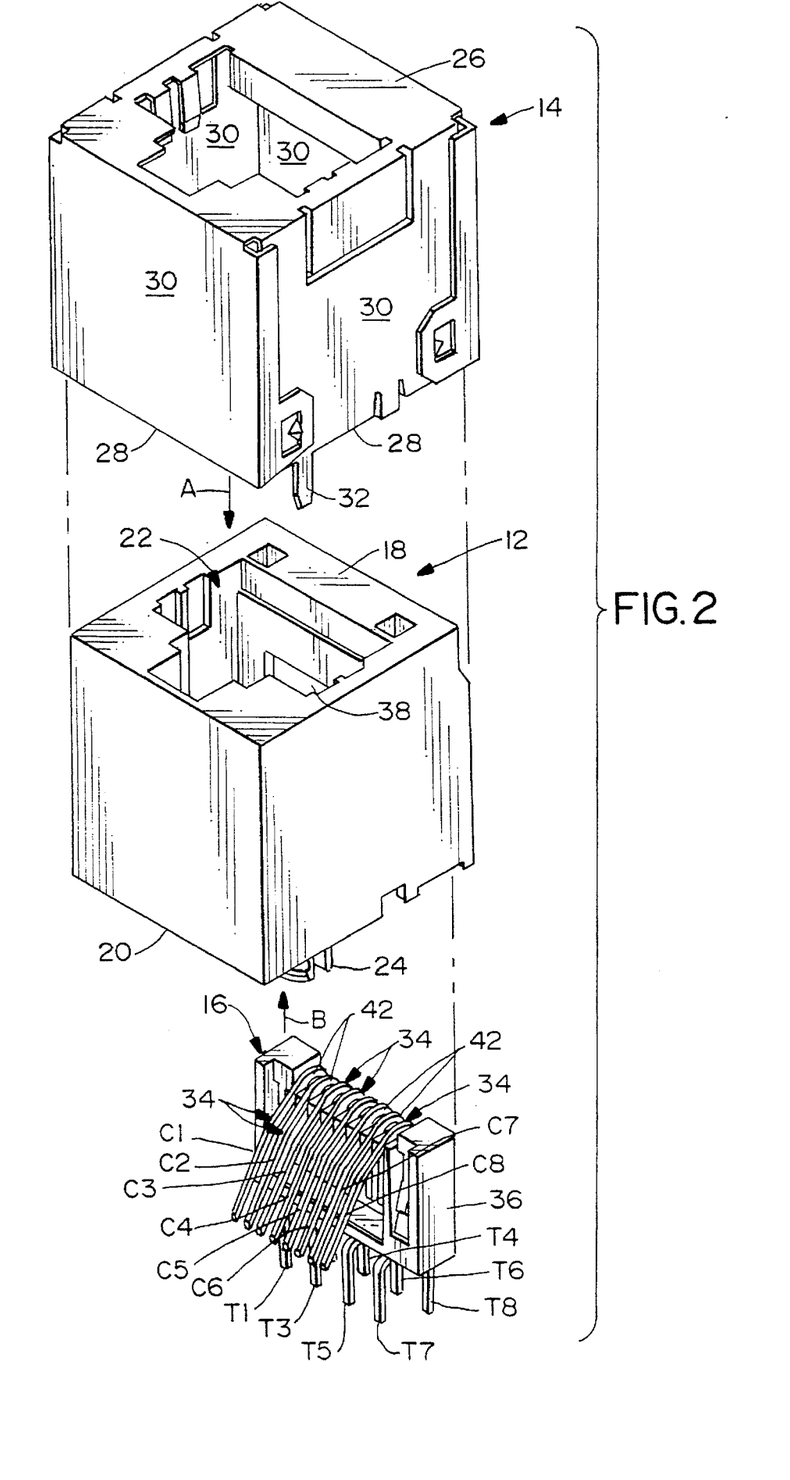
FIG. 2 is an exploded perspective view of the components of the connector.

Referring to the drawings in greater detail, and first to FIGS. 1 and 2, the invention is embodied in a modular jack type connector, generally designated 10 in FIG. 1. As seen in FIG. 2, in assembly, the connector includes three main components, namely: a dielectric housing means, generally designated 12; a shield, generally designated 14; and a terminal module, generally designated 16.

Housing 12 is unitarily molded of dielectric material such as plastic or the like in a generally cube-shaped configuration to define a mating face 18 and a mounting face 20. The housing defines a plug-receiving cavity, generally designated 22, extending inwardly from mating face 18 for receiving a complementary jack plug as is known in the art. The housing is adapted for mounting to a printed circuit board (not shown), and one or more integrally molded mounting posts 24 project from mounting face 20 for insertion into appropriate mounting holes in the board.

Shield 14 is stamped and formed of sheet metal material and, like housing 12, includes a mating face 26 and a mounting face 28. Actually, the mounting face is formed by the edges of four side walls 30 of the shield. The shield is generally box-shaped and is adapted to be mounted over housing 12, such as in the direction of arrow "A" (FIG. 2). One or more mounting feet 32 are stamped integrally with one or more of side walls 30 and project from edges 28 for insertion into appropriate holes in the printed circuit board. The feet are soldered to appropriate ground traces on the board and/or in the holes.

Terminal module 16 includes a plurality of terminals, generally designated 34, which are insert molded into a dielectric terminal block 36. Terminal module 16 is assembled into housing 12 in the direction of arrow "B" (FIG. 2), the module being located in an interior cavity 38 of the housing.

Figure 3:
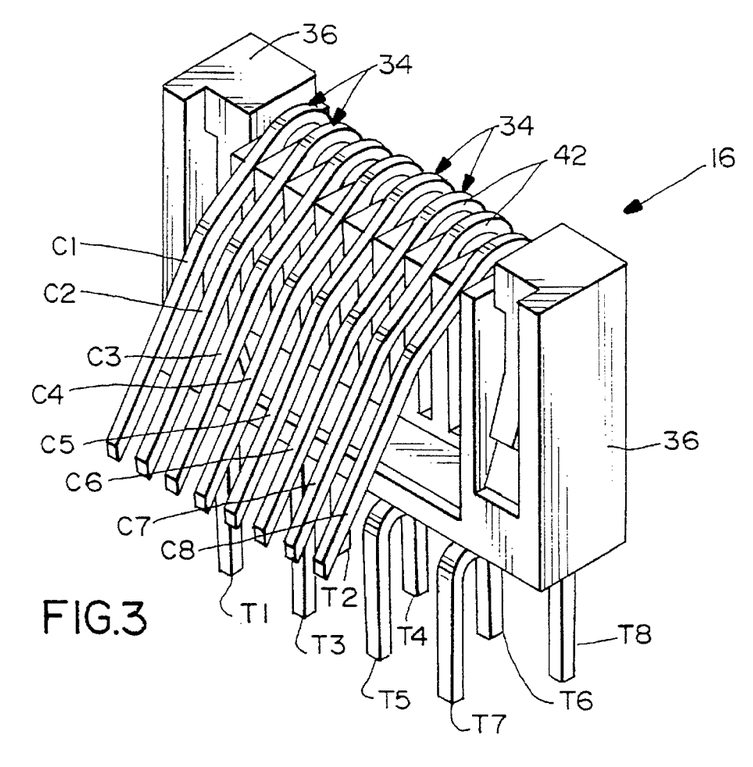
FIG. 3 is a perspective view of the terminal module of the connector.

Referring to FIG. 3 in conjunction with FIGS. 1 and 2, terminals 34 include spring beam contact portions C1–C8 which extend in cantilever fashion in a single row within plug-receiving cavity 22 of the housing. The spring beam contact portions extend from curved base portions 42 located within the housing outside the plug-receiving cavity. Tail portions T1–T8 of the terminals project from terminal block 36 and mounting face 20 of housing 12 for insertion into holes in the printed circuit board for solder connection to circuit traces on the board and/or in the holes. Tail portions T1–T8 are in two rows generally parallel to the single row of contact portions C1–C8. Each pair of adjacent terminals 34 includes a tail portion in each row thereof.

Figure 4:
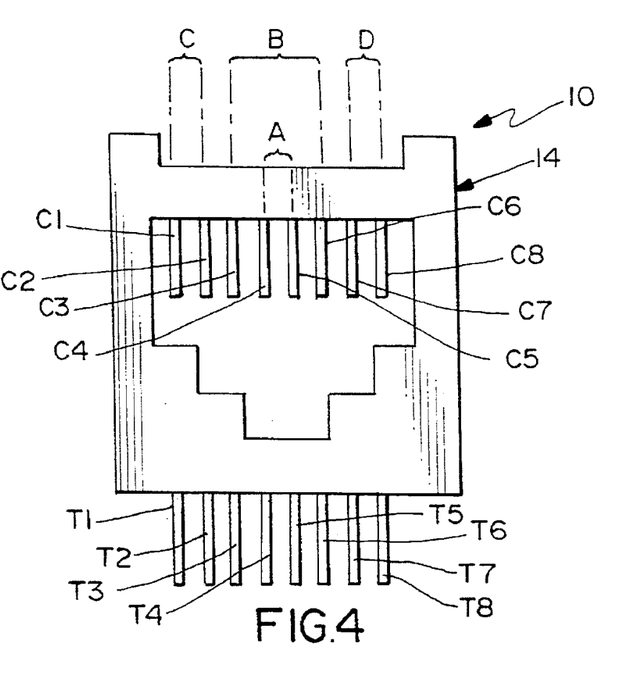
FIG. 4 is an elevational view of the mating face of the connector, for purposes of illustrating the given order of the terminal contacts.

FIG. 4 shows somewhat schematically the mating face 26 of connector 10 with contact portions C1–C8 visible within plug-receiving cavity 22 and tail portions T1–T8 projecting from the bottom of the connector. The top of FIG. 4 shows the arrangement of the terminals (i.e. contact portions C1–C8) according to current telecommunications industry standards in interconnecting twisted pair cables or wires. Specifically, pair "A" is centrally positioned. Pair "B" straddles pair "A". Pairs "C" and "D" are positioned on opposite sides of pair "B". In other words, according to this cabling system, the twisted pairs of cables or wires would correspond to the contact portions of terminals 34, as follows: C1/C2, C3/C6, C4/C5 and C7/C8.

With the above description of the cabling system and contact pairing in relation to FIG. 4, it can be understood that crosstalk within the jack is the worst between terminal pair "B", i.e. C3/C6 and every other pair. That is because the terminals comprising contact pair C3/C6 is the only pair that includes a contact close to all of the other pairs of contacts or terminals within the jack. This can be followed by noting that contact portion C3 is close to contact portion C2, which develops crosstalk between contact pairs C3/C6 and C1/C2. Contact portion C3 also is close to contact portion C4, which develops crosstalk between contact pairs C3/C6 and C4/C5. Similarly, contact portion C6 is close to contact portion C5, which develops crosstalk between contact pairs C3/C6 and C4/C5. Contact portion C6 also is close to contact portion C7, which develops crosstalk between contact pairs C3/C6 and C7/C8.

The invention is directed to significantly reducing the above-outlined crosstalk problems by configuring the terminals to have certain "looped" pairs of terminals while other pairs of terminals define physical capacitors within the jack, all being afforded by a manufacturing technique of reversely superimposing a pair of identical metallic lead frames.

Figure 5:
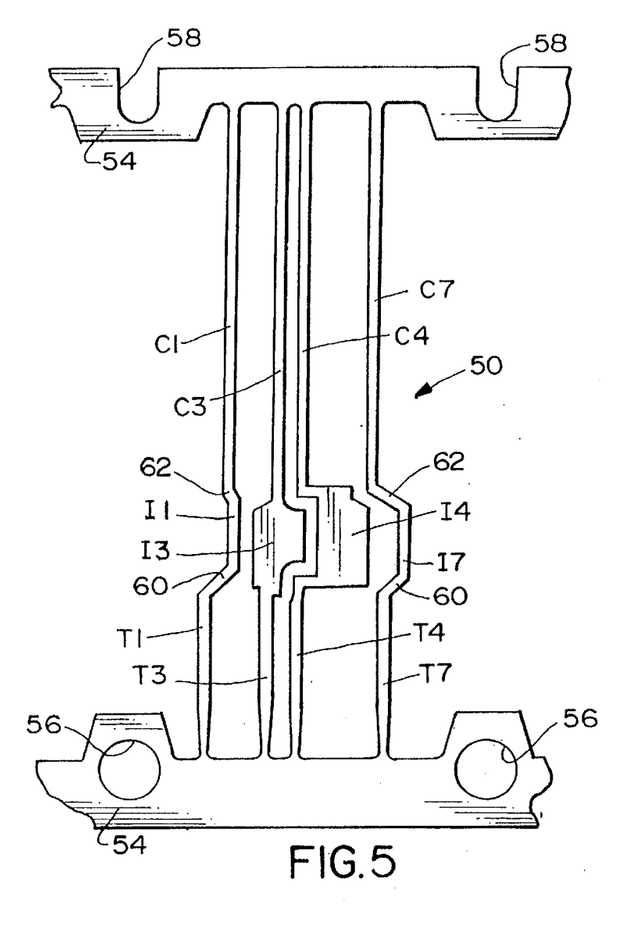
FIG. 5 is a plan view of the first metallic lead frame.
Figure 6:
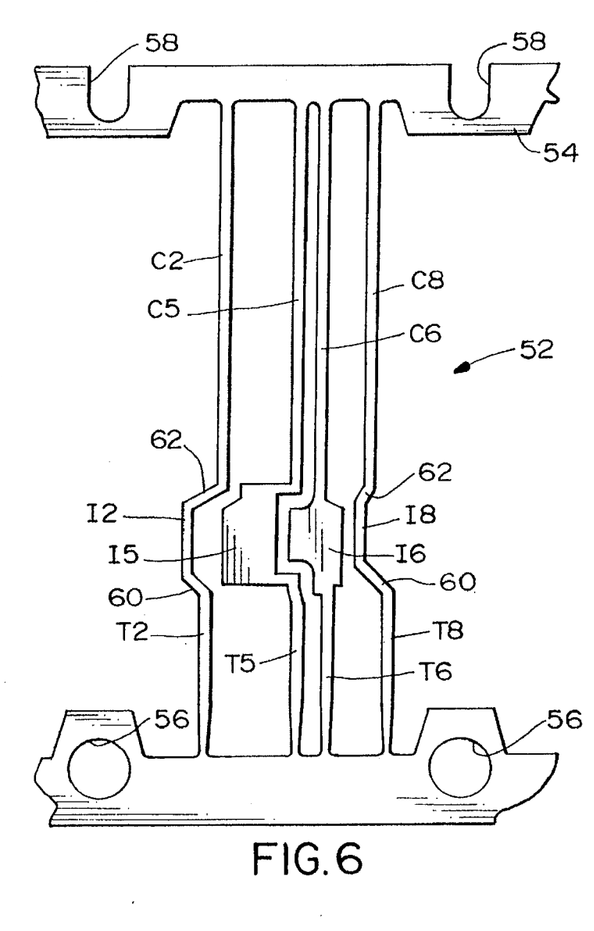
FIG. 6 is a plan view of the second metallic lead frame.

More particularly, FIG. 5 shows a first lead frame, generally designated 50, and FIG. 6 shows a second lead frame, generally designated 52. The lead frames are stamped from sheet metal material and are carried through a manufacturing process by carrier strips 54 which include indexing holes 56 and notches 58 as is known in the art. Lead frames 52 and 54 are configured to form terminals 34 of jack 10 according to the invention. In order to correlate the portions of the lead frames with the above-description of terminal contact portions C1–C8 and terminal tail portions T1–T8, the contact portions and the tail portions are correspondingly designated in FIGS. 5 and 6. First lead frame 50 and second lead frame 52, in essence, define terminals 34. The lead frames are identically constructed but are reversely oriented as viewed in comparing FIGS. 5 and 6. When the two lead frames are mounted within the jack, the lead frames are superimposed in a reverse-mounting orientation in a left-to-right direction transversely of the lead frames. Simply put, if lead frame 50 as shown in FIG. 5 is superimposed over lead frame 52 as shown in FIG. 6, this is the orientation of the portions of the terminals within the jack, as is shown in FIG. 7.

Figure 7:
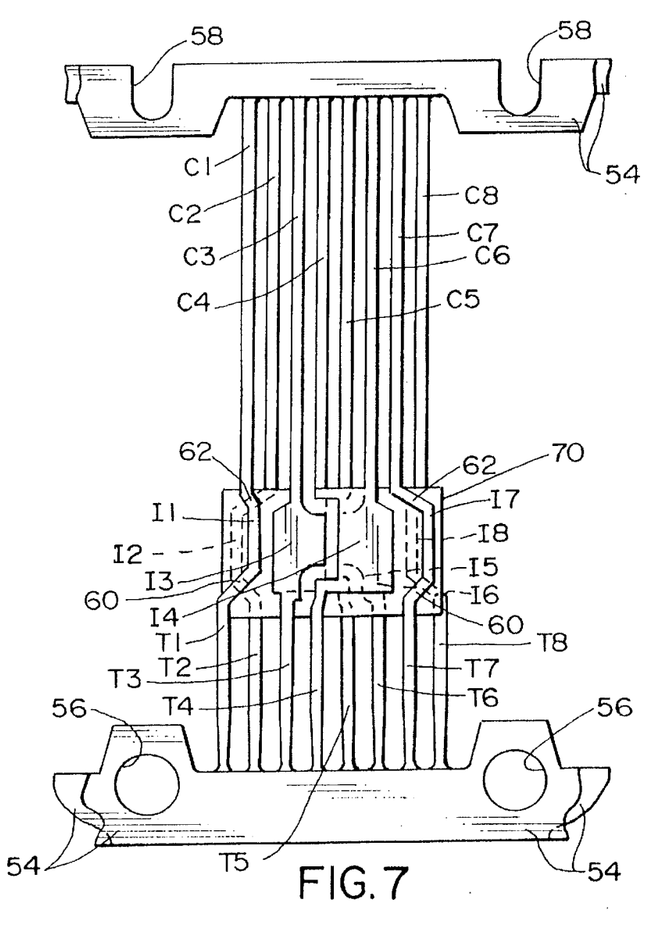
FIG. 7 is a plan view of the first and second metallic lead frames superimposed over each other in a reverse orientation, with an insulating plate inserted therebetween.

It can be seen in FIG. 7 that contact portions C1–C8 are in seriatim numerical order at the top of the subassembly shown in FIG. 7. Similarly, tail portions T1–T8 likewise are in numerical order. Therefore, the given order of the contact portions at the mating end of the jack is the same as the given order of the terminating or tail portions at the terminating end of the jack.

Referring back to FIGS. 5 and 6, it can be seen that contact portion C1 is joined to tail portion T1 by an intermediate portion I1, and contact portion C2 is joined to tail portion T2 by an intermediate portion I2 which is similarly configured to intermediate portion I1. When this pair of terminals are superimposed as shown in FIG. 7, intermediate portions I1 and I2 of terminal pair "C" (FIG. 4) are separated from each other in a direction generally parallel to the row of terminals. Similarly, contact portion C7 is joined to tail portion T7 by an intermediate portion I7, and contact portion C8 is joined to tail portion T8 by an intermediate portion I8. When these two terminals, i.e. terminal pair "D" (FIG. 4) are superimposed as shown in FIG. 7, intermediate portions I7 and I8 are separated from each other in a direction parallel to the row of terminals. Each of the terminals in each of pairs "C" and "D" include bowed portions 60 which join the respective intermediate portions and the respective tail portions of the terminals. The bowed portions of each of the pairs of terminals overlap each other in a plane transverse to the row of terminals. Bowed portions 62 also join intermediate portions I1, I2, I7 and I8 with contact portions C1, C2, C7 and C8, respectively, so that the terminals overlap both above and below the intermediate portions in order to maintain the same sequential numerical order of contact portions C1–C8 as well as tail portions T1–T8.

Summarizing the construction and functioning of the terminals in pairs "C" and "D" at opposite ends of the terminal array in jack 10, the separated and overlapped intermediate portions I1, I2, I7 and I8 of these terminals effectively perform the following functions:

(1) They separate the terminals in each pair as much as possible in the areas of the intermediate portions, and they limit the overall parallel length between two adjacent terminals of two different pairs, I.E. between terminal 7 from pair "D" and terminal 6 from pair "B" and between terminal 2 from pair "C" and terminal 3 from pair "B".

(2) Due to the overlapping of bowed portions 60 and 62, these pairs of terminals simulate twisted pairs of cables.

(3) The two cross-overs at the bowed portions maintain the same sequence or numerical order of contact portions C1–C8 as well as terminal or tail portions T1–T8.

(4) The terminals in each pair have the same lengths and, consequently, the same electrical resistance.

The terminals in terminal pair "A" and "B" are provided by the terminals shown in FIGS. 5 and 6 with contact portions C3–C6. However, the terminals in pair "A" include contact portions C4 and C5, whereas the terminals in pair "B" include contact portions C3 and C6. The invention contemplates reducing the crosstalk between these pairs of terminals, which, as described above, present the worst crosstalk problems within the jack, by providing physical capacitors between the terminals. Specifically, physical capacitors are provided between each terminal of each pair "A" and "B" and a terminal of the opposite pair.

More particularly, referring back to FIGS. 5–7, contact portion C3 is joined to tail portion T3 of the respective terminal by an enlarged intermediate portion or section I3. Contact portion C4 is connected to tail portion T4 by an enlarged intermediate portion or section I4. Contact portion C5 is connected to tail portion T5 by an enlarged intermediate section or portion I5. Contact portion C6 is connected to tail portion T6 by an enlarged intermediate section or portion I6.

When first lead frame 50 shown in FIG. 5 is superimposed over reversed lead frame 52 in FIG. 6, as is shown in FIG. 7, enlarged intermediate portion I3 is superimposed over enlarged intermediate portion I5 to form a physical capacitor therebetween, including a terminal from each pair "A" and "B" thereof. Similarly, enlarged intermediate portion I4 is superimposed over enlarged intermediate portion I6 to form a physical capacitor therebetween and, again, including a terminal from both pairs "A" and "B". These physical capacitors significantly reduce the crosstalk associated with pair "A" of terminals which include contact portions C4 and C5, and particularly the worst crosstalk scenario pair "B" which includes contact portions C3 and C6.

Figure 8:
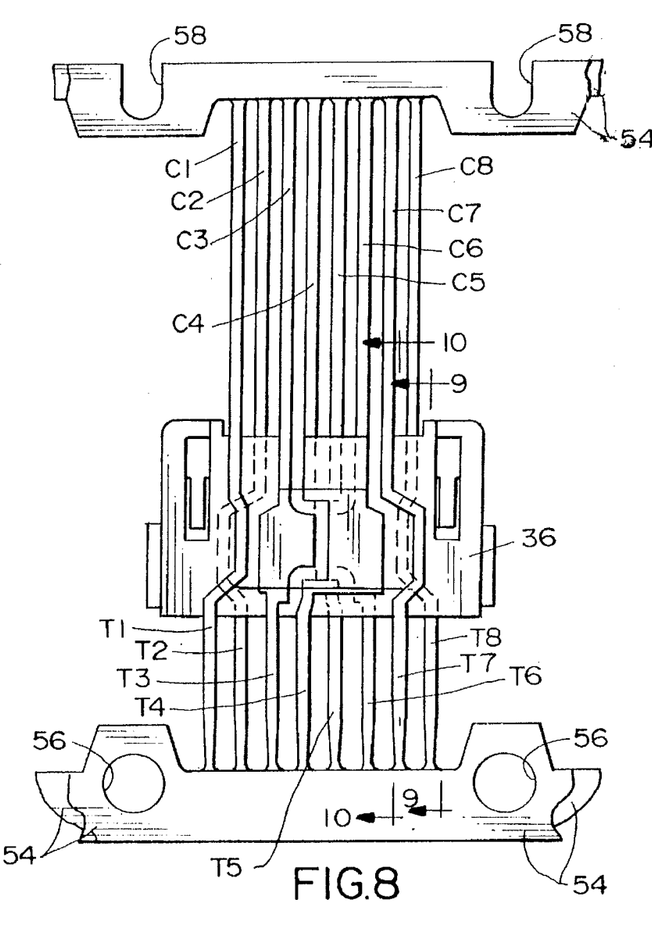
FIG. 8 is a plan view of the assembly of FIG. 7 in an insert molded module.
Figure 9:
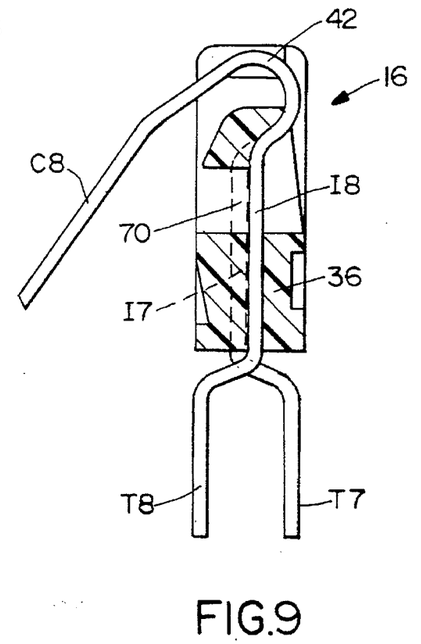
FIG. 9 is a section taken generally along line 9—9 of FIG. 8, but with the contact portions and tail portions of the terminals having been formed.
Figure 10:
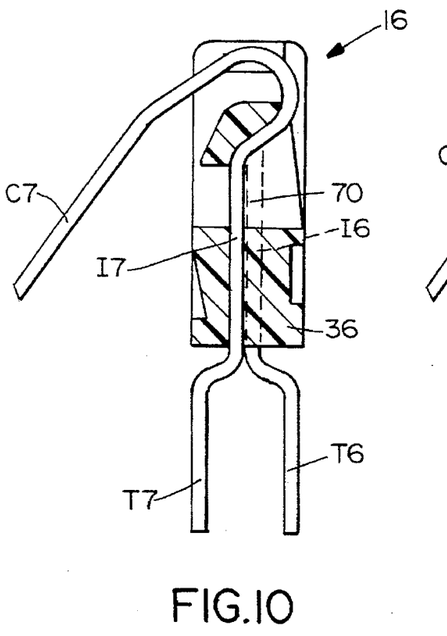
FIG. 10 is a view similar to that of FIG. 9, but taken generally along line 10—10 of FIG. 8.
Figure 11:
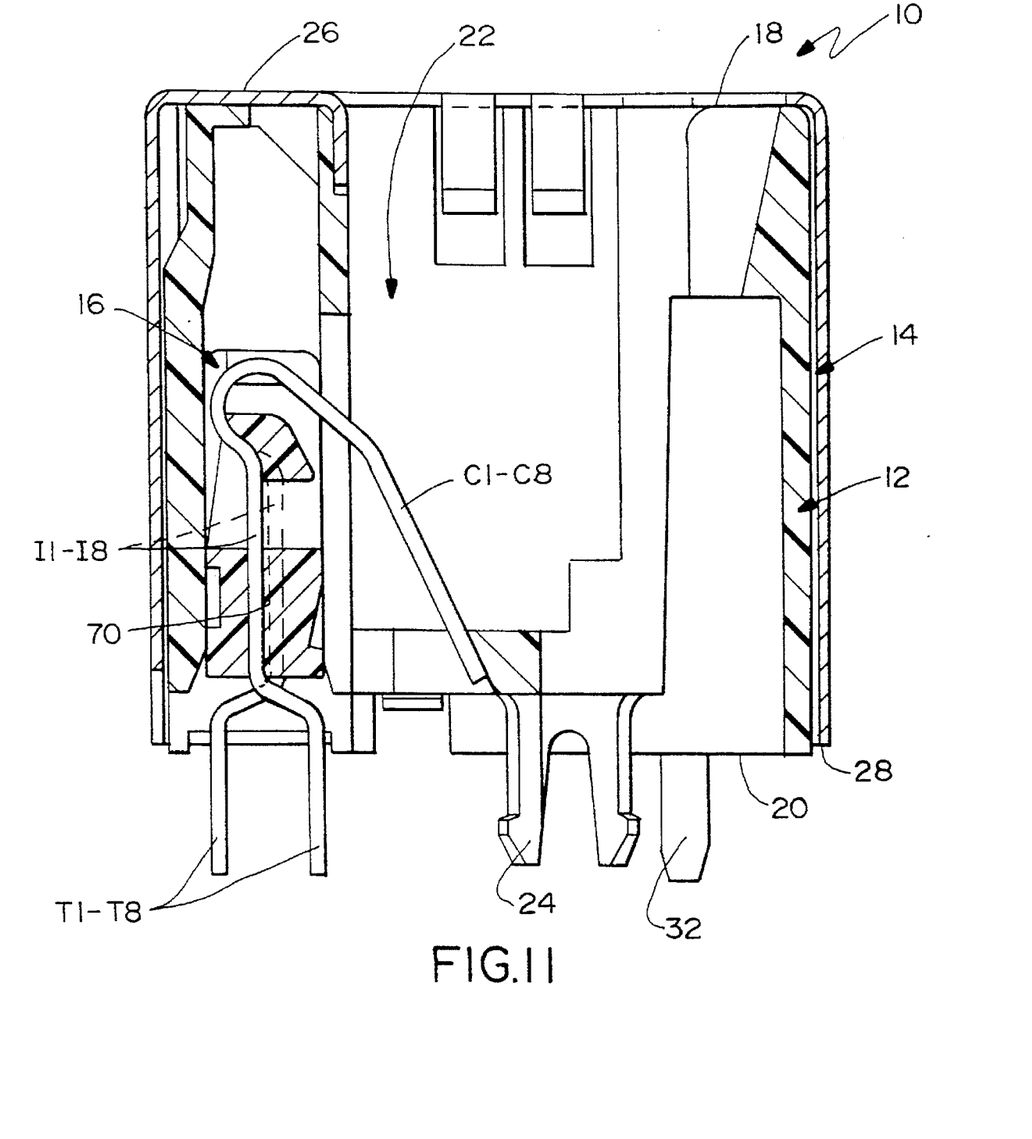
FIG. 11 is a section through the assembled jack.
Figure 12:
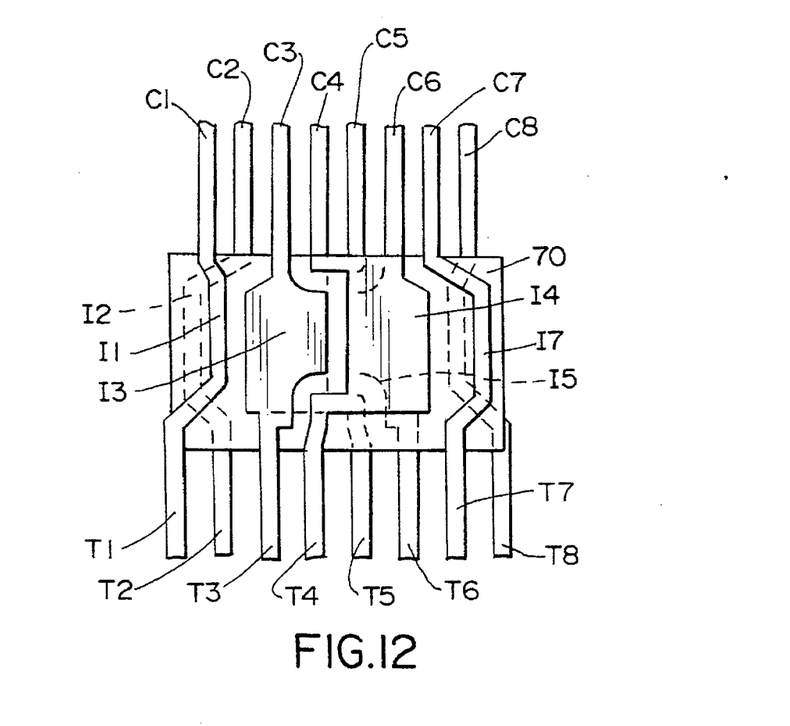
FIG. 12 is a somewhat schematic illustration of the terminals and the orders of their contact portions and tail portions.

FIG. 7 also shows another feature of the invention wherein an insulating strip or plate 70 is inserted between the two superimposed lead frames. In other words, this insulating plate extends generally parallel to the row of terminals and comprises a subassembly therewith. This subassembly then is insert molded within terminal block 36 as shown in FIG. 8 which, in turn, eventually becomes terminal module 16 shown in FIGS. 3 and 4. After insert molding superimposed lead frames 50 and 52, along with insulating plate 70, within terminal block 36, contact portions C1–C8 and tail portions T1–T8 are formed into their jack-mounted configurations as shown in FIGS. 9 and 10, to form the completed terminal module 16 which is assembled within housing 12, as described above and further shown in FIG. 11.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A modular jack type connector, comprising:
   a dielectric housing means defining a plug-receiving cavity; and
   a plurality of terminals mounted on the housing means and including
   spring beam contact portions extending in cantilever fashion in a single row within the plug-receiving cavity,
   the contact portions extending from curved base portions located in the housing means,
   tail portions projecting from the housing means in two rows generally parallel to said single row such that each pair of adjacent terminals includes a tail portion in each row thereof,
   intermediate portions extending between the curved base portions and the tail portions with the intermediate portions of at least one of said pair of adjacent terminals being separated from each other in a direction generally parallel to said rows,
   bowed portions joining the intermediate portions and the tail portions of said at least one pair of adjacent terminals with the bowed portions overlapping each other in a plane transverse to said rows,
   enlarged sections of the intermediate portions of at least one other pair of terminals overlapping each other in a plane generally parallel to said rows to define a physical capacitor between said other pair of terminals,
   wherein the connector includes eight terminals that can be numbered 1 through 8 seriatim along said row, terminals 1 and 2 and terminals 7 and 8 comprising two pairs of adjacent terminals at opposite ends of the row that include said transversely separated intermediate portions and said transversely bowed portions, and terminals 3 and 5 and terminals 4 and 6 comprising two pairs of terminals that include said enlarged sections to define two physical capacitors therebetween, and
   wherein corresponding tail portions of said terminals numbered 1 through 8 are arranged seriatim in alternate parallel rows.

2. The modular jack type connector of claim 1 wherein said terminals 1, 3, 4 and 7 are formed by a first planar metallic lead frame, and said terminals 2, 5, 6 and 8 are formed by a second planar metallic lead frame.

3. The modular jack type connector of claim 2 wherein said first and second metallic lead frames are identically constructed but are reverse-mounted on the dielectric housing means in a left-to-right direction transversely of the lead frames.

4. The modular jack type connector of claim 3, including an insulating plate between said lead frames.

5. A modular jack type connector, comprising;
   a dielectric housing means defining a plug-receiving cavity;

a plurality of terminals mounted on the housing means and including spring beam contact portions extending in cantilever fashion in a single row within the plug-receiving cavity, terminal portions projecting from the housing means, and intermediate portions between the contact portions and the terminal portions;

enlarged sections of the intermediate portions of at least one pair of terminals overlapping each other in a plane generally parallel to said row to define a physical capacitor between the one pair of terminals; and first and second planar lead frames, each including a plurality of said terminals and one terminal of said one pair thereof, superimposed over each other on the dielectric housing means, wherein the first and second planar lead frames are identically constructed but are reverse-mounted on the dielectric housing means in a left-to-right direction transversely of the planar lead frames.

6. The modular jack type connector of claim 5, including an insulating plate between said lead frames.

7. A modular jack type connector, comprising:

a dielectric housing means defining a plug-receiving cavity;

a plurality of terminals mounted on the housing means and including spring beam contact portions extending in cantilever fashion in a single row within the plug-receiving cavity, terminals portions projecting from the housing means, and intermediate portions between the contact portions and the terminal portions;

the intermediate portions of at least one pair of terminals being separated from each other in a direction generally parallel to said row with bowed portions joining the intermediate portions and the said terminal portions of said at least one pair, the bowed portions overlapping each other in a direction transverse to said row; and first and second planar lead frames, each including a plurality of said terminals and one terminal of said one pair thereof, superimposed over each other on the dielectric housing means.

8. The modular jack type connector of claim 7 wherein said first and second metallic lead frames are identically constructed but are reverse-mounted on the dielectric housing means in a left-to-right direction transversely of the lead frames.

9. The modular jack type connector of claim 8, including an insulating plate between said lead frames.

10. A modular jack type connector, comprising:

a dielectric housing means defining a plug-receiving cavity;

a plurality of terminals mounted on the housing means and including spring beam contact portions extending in cantilever fashion in a single row of a given order within the plug-receiving cavity, and terminal portions projecting from the housing means in a given order lengthwise of said row;

first and second lead frames, each including a plurality of said terminals and one terminal of said one pair thereof, superimposed over each other on the dielectric housing means, the lead frames being constructed so that said given order of the contact portions of the terminals is the same as the given order of the terminal portions of the terminals; and wherein said first and second metallic lead frames are identically constructed but are reverse-mounted on the dielectric housing means in a left-to-right direction transversely of the lead frames.

* * * * *